United States Patent [19]

Buter

[11] Patent Number: 5,070,135

[45] Date of Patent: Dec. 3, 1991

[54] DISPERSION OF ACRYLATE AND METHACRYLATE ADDITION POLYMERS IN AN ORGANIC LIQUID

[75] Inventor: Roelof Buter, Dieren, Netherlands

[73] Assignee: Akzo N.V., Netherlands

[21] Appl. No.: 337,724

[22] Filed: Apr. 13, 1989

[30] Foreign Application Priority Data

Apr. 15, 1988 [NL] Netherlands .................. 8800977

[51] Int. Cl.$^5$ ............................................. C08L 51/00
[52] U.S. Cl. .................. 524/504; 427/338.1; 524/923; 525/79
[58] Field of Search .................. 525/79; 524/504, 923; 427/338.1

[56] References Cited

U.S. PATENT DOCUMENTS 3,095,388  6/1963  Osmond et al. .................. 524/556
3,166,524  1/1965  Schmidle et al. .................. 524/500
3,814,721  6/1974  Maker et al. .................. 524/923

FOREIGN PATENT DOCUMENTS 0172589  2/1986  European Pat. Off. .
0238108  9/1987  European Pat. Off. .

Primary Examiner—Melvyn I. Marquis
Attorney, Agent, or Firm—Shirley L. Church; James K. Poole; Louis A. Morris

[57] ABSTRACT

The present invention pertains to a dispersion in an organic liquid of an acrylate-based and/or methacylate-based addition polymer stabilized by a graft copolymer of a polybutadiene with particular monomer components grafted thereon. The present invention also pertains to coating compositions based upon such a dispersion and to a process of coating a substrate with the coating composition. Finally, the present invention relates to a process for the preparation of the stabilizer for the dispersion.

26 Claims, No Drawings

DISPERSION OF ACRYLATE AND METHACRYLATE ADDITION POLYMERS IN AN ORGANIC LIQUID

The present application for patent is entitled to the benefit of an earlier filing date in a foreign country under 35 U.S.C. 119, based on priority application Ser. No. 8800977, The Netherlands, Apr. 15, 1988, which is hereby incorporated by reference.

BACKGROUND OF THE INVENTION

1. Field of the Invention

The present invention relates to dispersion compositions which are particularly useful as coatings, whether used alone or in combination with other coating materials. The dispersions are comprised of acrylate and/or methacrylate based addition polymer in an organic liquid, and are stabilized using a specialized kind of stabilizer developed to enable the dispersion compositions of the present invention.

2. Description of the Background Art

Dispersions of addition copolymers in organic liquids are described in EP-A-0172589, published Feb. 26, 1986 and entitled: Dispersion of Addition Copolymers in an Organic Liquid, which is hereby incorporated by reference. These dispersions are useful in providing a coating having a glossy finish for wood, plastic materials and metal, and have been used to provide a coating having a metallic appearance. However, many of the coatings having a metallic appearance are used as exterior finishes for automobiles and other equipment exposed to weathering and acid rain. Typically these exterior finishes are provided using a weather-resistant basecoat/clearcoat coating system wherein the basecoat having a metallic appearance is protected by an overlaying clearcoat. The dispersions described in EP-A-0172589 are not suitable for use in basecoat/clearcoat coating systems of the type which provide a high gloss metallic appearance.

The basecoat/clearcoat systems require the application of two coatings. The first coating applied is a basecoat which comprises a basic polymer which provides a coating film as well as additives and adjuvants, pigments, colorants and dispersing agents. The second coating applied provides a clear coating film over the surface of the basecoat, to obtain a high gloss. Upon application of the clearcoat, the orientation of pigment particles in the underlaying basecoat can be affected in a manner detrimental to the metallic appearance of the basecoat, rendering such basecoats unsuitable for use in the system.

The ability of the basecoat to provide and retain orientation of the pigment particles required for the metallic appearance is increased when higher solids basecoat formulations can be used (for example about 40% by weight solids or greater). Higher solids basecoats depend on the stabilizer used to maintain the dispersion of the basecoat solids in the organic liquid from which the solids are applied to the surface to be coated.

Aqueous dispersions of acrylic polymers stabilized using a particular copolymer to obtain high solid coatings are disclosed in EP-A-0238108, published Sept. 23, 1987, and entitled: Aqueous Dispersion Of An Addition Polymer, A Coating Composition Based Thereon And A Process For Coating A Substrate With Such Coating Composition, which is hereby incorporated by reference. Such aqueous dispersion stabilizers, while similar, are not suitable for use in organic liquid based dispersions.

SUMMARY OF THE INVENTION

According to the present invention, dispersion compositions comprising acrylate and/or methacrylate based addition polymers in an organic liquid are provided wherein the dispersion is stabilized using specialized stabilizers of the type disclosed herein. In particular, the dispersion compositions can be used as basecoat compositions for producing basecoat/clearcoat systems capable of providing high gloss metallic appearance coatings.

To this end, the present invention provides for a dispersion in an organic liquid of an acrylate and/or methacrylate addition polymer, characterized in that per 100 parts by weight of the addition polymer, the dispersion contains 5-100 parts by weight of a dispersion stabilizer, the dispersion stabilizer comprising a graft copolymer composed of:

(1) 10-60 parts by weight of a polybutadiene built up from at least 60% by weight 1,3-butadiene, having grafted to it the following;
(2) 10-70 parts by weight of a first monomer mixture consisting essentially of
 (a) 20-60 mole % of a styrene,
 (b) 20-70 mole % of an hydroxyalkyl methacrylate having 2 to 6 carbon atoms in the alkyl group, and
 (c) 0-40 mole % of a monoethylenically unsaturated compound different from that of (b); and
(3) 0-60 parts by weight of a second monomer mixture consisting essentially of
 (d) 20-60 mole % of a styrene,
 (e) 30-80 mole % of a methacrylate selected from the group consisting of cycloalkyl methacrylate, alkyl methacrylate, and combinations thereof, said cycloalkyl group or alkyl group having 1-12 carbon atoms, and
 (f) 0-40 mole % of monoethylenically unsaturated compound different from that of (e), wherein the total of the parts by weight of the polybutadiene, the first monomer mixture and the second monomer mixture is 100.

In the aforementioned formulations, by a styrene is it meant styrene and methyl styrenes such as $\alpha$-methyl styrene, ortho-methyl styrene, meta-methyl styrene and/or para-methyl styrene.

Examples of suitable different monoethylenically unsaturated compounds include monovinyl aromatic hydrocarbons such as vinyl toluene and vinyl napthalene; (meth)acrylic esters such as methyl methacrylate, ethyl acrylate, ethyl methacrylate, 2-hydroxyethyl acrylate, 2-hydroxyethyl methacrylate, 2-hydroxypropyl methacrylate, 4-hydroxybutyl acrylate, 6-hydroxyhexyl acrylate, p-hydroxycyclohexyl acrylate, 8-hydroxyoctyl acrylate, 2-methoxyethyl methacrylate, 2-ethoxy ethyl methacrylate, ethoxymethyl methacrylate, glycidyl methacrylate, butyl methacrylate, 2-ethylhexyl acrylate, n-dodecyl acrylate and n-hexadecyl acrylate; (meth)acrylamides; and other compounds such as vinyl chloride, vinyl acetate and vinyl propionate, as comply with the appropriate limitations regarding the number of carbon atoms present in the alkyl or cycloalkyl group.

Of course, by the use of the terminology "different", for the first monomer mixture the hydroxyalkyl methacrylates having 2 to 6 carbon atoms in the alkyl group should be excluded from the above list of different monoethylenically unsaturated compounds, while for the second monomer mixture cycloalkyl and/or alkyl methacrylates having 1-12 carbon atoms in the cycloalkyl or alkyl group should likewise be excluded. Also, ethylenically unsaturated monocarboxylic acids and amino-group containing esters thereof are not considered suitable different monoethylenically unsaturated compounds in the present dispersion stabilizers other than in minor amounts, generally less than 20 mole %, and more preferably less than 10 mole %, of the total monomers.

The dispersions according to the present invention distinguish themselves from the well-known dispersions (without the dispersion stabilizer) in that they display excellent stability, particularly when used in combination with "solution" resins such as polyesters, polyacrylates or polyurethanes.

In a preferred embodiment, the dispersion stabilizer should comprise 10-60 parts by weight of the second monomer mixture. It is believed that the presence of the second monomer mixture increases the hydrophobic part of the stabilizer to improve the stability of the dispersion, more particularly the stability vis a vis shearing forces, as may for instance be found in a closed circuit.

In more preferred embodiments, the first monomer mixture consists essentially of:
  (a) 30-60 mole % of styrene,
  (b) 30-70 mole % of a hydroxyalkyl methacrylate having 2 to 6 carbon atoms in the alkyl group, and
  (c) 0-20 mole % of a monoethylenically unsaturated compound, different from that of (b),
while the second monomer mixture consists essentially of:
  (d) 30-60 mole % of styrene,
  (e) 30-70 mole % of a cycloalkyl methacrylate, an alkyl methacrylate, or combinations thereof having 1-12 carbon atoms in the cycloalkyl or alkyl group, and
  (f) 0-20 mole % of a monoethylenically unsaturated compound, different from that of (e).

Also in more preferred embodiments, the polybutadiene comprises from at least 80% by weight 1,3-butadiene, with the remainder of the polybutadiene comprising a different ethylenically unsaturated component such as, for example, styrene, acrylonitrile or isoprene. Additionally, the polybutadiene should have a number average molecular weight ranging from about 2000 to about 6000, since below this molecular weight range little stabilization takes place and above this molecular weight range the viscosity of the polybutadiene becomes too high, increasing the risk of full gelation.

The copolymerization of the monomer mixtures for the dispersion stabilizer according to the present invention is generally carried out with the aid of a radical initiator in an amount of 1-12% by weight, more preferably 2-10% by weight (calculated on the weight of the polybutadiene), in an organic solvent, at a temperature of 60° C., to 150° C., more preferably 80° C. to 110° C., and under an atmosphere of inert gas such as nitrogen.

As a radical initiator, it is preferred that use be made of di-t-butyl peroxide, dibenzoyl peroxide or a substituted dibenzoyl peroxide, such as di(2-methylbenzoyl)peroxide and di(2,4-dichlorobenzoyl)peroxide.

Suitable organic solvents include ether group containing alcohols such as propylene glycol monopropyl ether, propylene glycol monobutyl ether, propylene glycole monoisopropyl ether, propylene glycol monoisobutyl ether, diethylene gylcol monobutyl ether and dipropylene glycol monomethyl ether, or esters of these alcohols such as the acetic or propionic esters, or mixtures of such esters and alcohols containing 1-4 carbon atoms.

It is preferred that the first 10-70 parts by weight of the first monomer mixture be copolymerized in the presence of 10-60 parts by weight of the polybutadiene, after which 0-60 parts by weight of the second monomer mixture are copolymerized in the presence of the resulting reaction product. Alternatively, the second monomer mixture can first be polymerized in the presence of the polybutadiene, after which the first monomer mixture is copolymerized in the presence of the resulting reaction product. In both cases, the total parts by weight of the first monomer mixture, second monomer mixture and polybutadiene is 100.

A suitable process comprises preparing the stabilizer in a concentration of 30-50% by weight in the organic solvent. If desired, the resulting solution or dispersion may be diluted with a solvent such as ethanol, optionally at elevated temperature, to a solids content of, for example, 10% by weight. As a rule, a bluish dispersion of the stabilizer will be obtained with a mean particle size of 100-250 nm (determined by dynamic light scattering). In this process, it is believed that the hydrophobic part of the stabilizer (the polybutadiene with optionally the second monomer mixture grafted thereon) is insoluble in the indicated dispersing agent — it is stabilized by the hydrophilic part (the first monomer mixture) of the stabilizer solvated by the dispersing agent.

The dispersion of the acrylate or methacrylate addition polymer is produced by the polymerization of the monomers for the addition polymer in the presence of the dispersion stabilizer. Preferably, the resulting dispersion contains 5-100 parts by weight of the dispersion stabilizer per 100 parts by weight of the resulting addition polymer.

Examples of suitable acrylate and methacrylate monomers comprising the addition polymer include cycloalkyl and alkyl acrylates as well as cycloalkyl and alkyl methacrylates wherein the cycloalkyl group or the alkyl group contains 1-24 carbon atoms, particular examples of which may be found in previously incorporated EP-A-0238108.

Optionally, the aforementioned acrylate and methacrylate monomers can be mixed with one or more other ethylenically unsaturated monomers such as hydroxy-functional or epoxy-functional acrylates and methacrylates and other examples which may also be found in previously incorporated EP-A-0238108.

As a further option, small amounts (generally less than 10% by weight and, more preferably when utilzed from 0.5-5% by weight, based upon the monomers) of suitable polyfunctional monomers can be used, as indicated in previously incorporated EP-A-0238108. The use of a small amount of these polyfunctional monomers will result in full or partial cross-linking of the polymer micro particles.

Polymerization of the monomers referred to above is carried out with the aid of a radical initiator in a polar organic diluent. As organic diluent is preferably used mainly an alcohol containing 1-4 carbon atoms, more preferably ethanol. On conclusion of the dispersion polymerization, the polar organic diluent can be replaced wholly or in part with a different, optionally less polar and/or volatile diluent by adding a different diluent to the reaction product after the entire or part of the polar organic diluent is distilled off.

It is preferred that the polymerization reaction be carried out under an atmosphere of an inert gas, such as nitrogen, and preferably under reflux using 0.1–5% by weight based on the weight of the monomers) of a radical initiator such as an organic peroxide (e.g., dilauroyl peroxide, dibenzoyl peroxide) or an azo compound (e.g., azobisisobutyronitrile, azobiscyanovaleric acid).

The dispersion according to the present invention may be employed as coating compositions alone or in combination with acrylate resins, polyester resins or alkyd resins; the coating composition also contains a curing agent such as melamine resin or a polyisocyanate which may be blocked or not. It is preferred that the dispersions be used in amounts of 5–40% by weight of the solids content of the final coating composition.

The dispersions according to the present invention may be applied to a substrate in any desirable manner, such as by roller coating, spraying, brushing, sprinkling, flow coating, dipping, electrostatic spraying or electrophoresis. Suitable substrates include wood, metal and synthetic materials. Curing may be carried out at ambient temperature after evaporation of the solvent, or at higher temperatures in the range of, for example, 60° C. to 160° C., in a baking oven and over a period of 10 to 60 minutes.

The dispersions of the addition polymer according to the present invention are extremely suitable for coating compositions of a high-gloss metallic appearance. To this end the compositions according to the present invention are used in the base coat along with so-called non-leafing aluminum paste or some other metallic pigment. In addition, the base coat typically contains the usual additives and adjuvants, such as pigments, dispersing agents, colorants, organic solvents and accelerators for the curing reaction.

In order to obtain a high gloss with such metallic pigment containing coatings, a second clearcoat is typically applied over the pigmented coating. This dual coat system is referred to as a basecoat/clearcoat system.

The composition of the clearcoat is generally a solvent-borne baking lacquer of a conventional acrylate-/melamine composition. This system may be cured in a baking oven for 20–30 minutes at a temperature of 130° C. to 150° C. Also a clearcoat can be applied, for instance a so called two-component system based on an acrylate/polyisocyanate composition which can be cured in a baking oven for 20–30 minutes at a temperature of 60° C. to 80° C.

The use of a dispersion according to the invention has the advantage that the orientation of the pigment particles required for the metallic effect is retained during re-spraying with the clear coat, as a high solids content of the base coat (≧40% by weight) may be realized with such dispersions. Such an orientation is expressed in flop value.

The invention will be further described in the following examples.

In these examples the mean particle size of the dispersion is determined by dynamic light scattering, the dispersion being diluted with ethanol to a solids content of about 0.1% by weight. The viscosity is determined with a Brookfield viscometer. The hydroxyl number is expressed in mg KOH/g. The solids content is determined in accordance with ASTM method 1644-59 with heating at 130° C. over a period of 30 minutes. The flop is measured with the M.A.T. (Metallic Appearance Tester), a flop ≧30 being high and a flop of 20 low. For an automotive lacquer 30 would be an acceptable flop value, and 20 would clearly be unacceptable.

PREPARATION OF STABILIZERS

Example 1: Preparation of Stabilizer A

The following ingredients were homogeneously mixed in a 3 liter flask fitted with a stirrer, a thermometer, a reflux condenser, and a dropping funnel:

351 g of polybutadiene having a number average molecular weight of 2800 and a hydroxyl number of 46.4 and composed of 20% of vinyl-1,2, 60% of trans-1,4, and 20% of cis-1,4 polybutadiene 1063.5 g of propylene glycol methylether acetate (PGMA)

The dropping funnel was filled with a homogeneous mixture of:

156 g of styrene 195 g of hydroxyethyl methacrylate 42.1 g of dibenzoyl peroxide (50% by weight in dicyclohexyl phthalate)

After deaeration, the contents of the flask and the dropping funnel were brought under a nitrogen atmosphere. The contents of the flask were heated to 90° C., whereupon the content of the dropping funnel were introduced into the flask over a period of 1 hour, the contents of the flask being kept at 90° C. After the dropping funnel had been emptied, the temperature of the contents of the flask were kept at 90° C. for another 5 hours. A dispersion of Stabilizer A in PGMA was obtained, having a solids content of 40% by weight with a viscosity of 2.6 Pa.s.

Example 2: Preparation of Stabilizer B

Step 1

The following ingredients were homogeneously mixed in a 2 liter flask fitted with a stirrer, a thermometer, a reflux condenser, and a dropping funnel:

200 g of polybutadiene having a number average molecular weight of 2800 and a hydroxyl number of 46.6 and composed of 20% of vinyl-1,2, 60% of trans-1,4 and 20% of cis-1,4 polybutadiene 454 g of propylene glycol methylether acetate (PGMA)

151 g of ethanol

The dropping funnel was filled with a homogeneous mixture of:

88.9 g of styrene 111.1 g of hydroxyethyl methacrylate 20.0 g of dibenzoyl peroxide (50% by weight in dicyclohexyl phthalate)

After deaeration, the contents of the flask and the dropping funnel were brought under a nitrogen atmosphere. The contents of the flask were heated to reflux temperature (90°) C. Next, the contents of the dropping funnel were introduced into the flask over a period of 1 hour, the contents of the flask being kept at 90° C. After the dropping funnel had been emptied, the contents of the flask were kept at 90° C. for another 5 hours.

Step II

Added to the reaction product of Step I in the flask are:

114 g of propylene glycol methylether acetate (PGMA)

38 g of ethanol

The dropping funnel was filled with a homogeneous mixture of:
- 49.5 g of styrene
- 38.1 g of methyl methacrylate
- 12.4 g of hydroxyethyl methacrylate
- 8 g of dibenzoyl peroxide (50% by weight in dicyclohexyl phthalate)

After deaeration, the contents of the flask and the dropping funnel were brought under a nitrogen atmosphere, over period of 30 minutes the contents of the dropping funnel were introduced into the flask while the reflux temperature of the contents of the flask (=90° C.) was maintained. After the dropping funnel had been emptied, the contents of the flask were kept at 90° C. for a further 5 hours. Obtained was a dispersion of Stabilizer B in PGMA having a solids content of 40% by weight. The viscosity was 1.16 Pa.s.

Example 3: Preparation of Stabilizer C

Step I of the preparation of Stabilizer B was repeated.

Step II

Added to the reaction product of Step I in the flask were:
- 229 g of PGMA
- 76 g of ethanol The dropping flask was filled with a homogeneous mixture of
- 99 g of styrene
- 76.2 g of methyl methacrylate
- 24.8 g of hydroxyethyl methacrylate
- 16 g of dibenzoyl peroxide (50% by weight in dicyclohexyl phthalate)

Over a period of 1 hour the contents of the dropping funnel were introduced into the flask while the contents of the flask were maintained at their reflux temperature (=90° C.). After the dropping funnel had been emptied, the contents of the flask were kept at 90° C. for another 5 hours. Obtained is a dispersion of Stabilizer C in PGMA having a solids content of 40% by weight.

The viscosity was 1.7 Pa.s.

Example 4: Preparation of Stabilizer D

Step I

The following ingredients were mixed in a 2 liter flask fitted with a stirrer, a thermometer, a reflux condenser and a dropping funnel:
- 200 g of polybutadiene having a number average molecular weight of 2800 and a hydroxyl number of 46.6 and composed of 20% of vinyl-1,2,60% of trans-1,4 and 20% of cis-1,4 polybutadiene
- 604 g of PGMA The dropping funnel is filled with a homogeneous mixture of:
- 88.9 g of styrene
- 111.1 g of hydroxyethyl methacrylate
- 16 g of dibenzoyl peroxide (50% by weight in dicyclohexyl phthalate)

After deaeration, the contents of the flask and the dropping funnel were brought under a nitrogen atmosphere. The contents of the flask were heated to 90° C., whereupon the contents of the dropping funnel were introduced into the flask over a period of 1 hour, the contents of the flask being kept at 90° C. After the dropping funnel had been emptied, the contents of the flask were kept at 90° C. for another 5 hours.

Step II

To the reaction product of Step I in the flask were added:
- 304 g of PGMA

The dropping funnel was filled with a homogeneous mixture of:
- 92.6 g of styrene
- 99.0 g of methyl methacrylate
- 8.4 g of methacylamide
- 16 g of dibenzoyl peroxide (50% by weight in dicyclohexyl phthalate)

After deaeration, the contents of the flask and the dropping funnel were brought under a nitrogen atmosphere. Over a period of 30 minutes the contents of the dropping funnel were introduced into the flask, while its contents were kept at 90° C. After the dropping funnel had been emptied, the contents of the flask were kept at 90° C. for a further 5 hours. Obtained was a dispersion of Stabilizer D in PGMA having a solids content of 40% by weight. The viscosity was 4.7 Pa.S.

PREPARATION OF STABILIZED DISPERSION COMPOSITIONS

Example 5

The following ingredients were weighed into a 2 liter flask fitted with a thermometer, a stirrer, a reflux condenser, and a dropping funnel:
- 125 g of stabilizer A (40% by weight in PGMA)
- 675 g of ethanol The dropping funnel was filled with a homogeneous mixture of:
- 107.1 g of butyl acrylate
- 84.2 g of methyl methacrylate
- 3.80 g of trimethylol propane triacrylate
- 4.88 g of azobisisobutyronitrile After deaeration, the contents of the flask and the dropping funnel were brought under a nitrogen atmosphere. The contents of the flask were heated with a stirring to reflux temperature (78° C.). The contents of the dropping funnel were introduced into the flask over a period of 2 hours, the temperature being kept at 78° C. After the addition of the monomer mixture the contents of the flask were kept at 78° C. for another 5 hours.

After the reaction mixture had been cooled, 300 g of PGMA were added and the ethanol is distilled off under reduced pressure until the dispersion had a solids content of 40% by weight.

Viscosity: 17 Pa.s

Particle size: 115 nm

Example 6

The following ingredients were weighed into a 2 liter flask fitted with a thermometer, a stirrer, a reflux condenser, and a dripping funnel:
- 187.5 g of stabilizer A (40% by weight in PGMA)
- 675 g of ethanol The dropping funnel was filled with a homogeneous mixture of:
- 72.65 g of 2-ethylhexyl acrylate
- 78.9 g of methyl methacrylate
- 15.4 g of hydroxyethyl methacrylate
- 3.34 g of trimethylol propane triacrylate
- 4.7 g of azobisisobutyronitrile After deaeration, the contents of the flask and the dropping funnel were brought under a nitrogen atmosphere. The contents of the flask were heated with a stirring to reflux temperature (78° C.). At this temperature the contents of the dropping funnel were introduced into the flask over a period of 2 hours. After total addition of the contents of the dropping funnel, the contents of the flask were kept at 78° C. for another 5 hours.

After the reaction mixture had been cooled, 262.5 g of PGMA were added and the ethanol was distilled off under reduced pressure until the dispersion had a solids content of 40% by weight.
Viscosity: 4 Pa.s
Particle size: 110 nm

Example 7

The following ingredients were weighed into a 2 liter flask fitted with a thermometer, a stirrer, a reflux condenser, and a dropping funnel:
156.25 g of Stabilizer B (40% by weight in PGMA)
675 g of ethanol
The dropping funnel was filled with a homogeneous mixture of:
77.85 g of 2-ethylhexyl acrylate
84.5 g of methyl methacrylate
16.5 g of hydroxyethyl methacrylate
3.6 g of trimethylol propane triacrylate
5.0 g of azobisisobutyronitrile After deaeration, the contents of the flask and the dropping funnel were brought under a nitrogen atmosphere. The contents of the flask were heated with stirring to reflux temperature (78° C.). While kept at this temperature, the contents of the dropping funnel were introduced into the flask over a period of two hours. After total addition of the contents of the dropping funnel, the contents of the flask were kept at 78° C. for another 5 hours.

After the reaction 281.25 g of PGMA were added, followed by distilling off of the ethanol under reduced pressure until the dispersion had a solids content of 40% by weight.
Viscosity: 0.77 Pa.s
Particle size: 125 nm

Example 8

The following ingredients were weighed into a 2 liter flask fitted with a stirrer, a thermometer, a reflux condenser, and a dropping funnel:
187.5 g of Stabilizer C (40% by weight in PGMA)
850 g of ethanol
The dropping funnel was filled with a homogeneous mixture of:
72.65 g of 2-ethylhexyl acrylate
78.9 g of methyl methacrylate
15.4 g of hydroxyethyl methacrylate
3.34 g of trimethylol propane triacrylate
4.7 g of azobisisobutyronitrile The contents of both the flask and the dropping funnel were brought under $N_2$, after which the contents of the flask were heated to reflux temperature (78° C.). Next, the contents of the dropping funnel were added at a constant rate to those of the flask over a period of 2 hours. Next, the contents of the flask were kept at 78° C. for another 5 hours.

Following the reaction, 262.5 g of PGMA were added after which the ethanol was distilled off under reduced pressure until the dispersion had a solids content of 40% by weight.
Viscosity: 0.67 Pa.S
Particle size: 132 nm

Example 9

The following ingredients were weighed into a 2 liter flask fitted with a stirrer, a thermometer, a reflux condenser, and a dropping funnel:
187.5 g of Stabilizer D (40% by weight in PGMA)
850 g of ethanol
The dropping funnel is filled with a homogeneous mixture of:
72.1 g of ethylhexyl acrylate
78.4 g of methyl methacrylate
15.3 g of hydroxyethyl methacrylate
4.15 g of methacrylamide
5.1 g of azobisisobutyronitrile
47.5 g of ethanol The contents of both the flask and the dropping funnel were brought under an $N_2$ atmosphere, after which the flask was heated to reflux temperature (78° C.). Next, the contents of the dropping funnel were added at a constant rate to those of the flask over a period of 2 hours at a temperature of 78° C. Then the contents of the flask were stirred for a further 2 hours at 78° C., after which another 1 g of azobisisobutyronitrile in 50 g of ethanol was added to the contents of the flask over a period of 30 minutes. Subsequently, the contents of the flask were kept at 78° C. for another 2 hours.

Following the reaction, 262.5 g of PGMA were added, after which the ethanol was distilled off under reduced pressure until the dispersion had a solids content of 40% by weight.
Viscosity: 0.63 Pa.s
Particle size: 128 nm

PREPARATION OF BASECOAT COMPOSITIONS USING STABILIZED DISPERSION COMPOSITIONS

All the stabilized dispersion compositions described in EXAMPLES 5-9 above were used in the preparation of base coat compositions consisting of the following components:
19.2 g of aluminum paste (available under the trademark 500 AR ex Silberline)
37.6 g of polyacrylate resin, prepared from butyl methacrylate, styrene, hydroxyethyl methacrylate, styrene, hydroxyethyl methacrylate, 2-ethylhexyl acrylate, and n-octyl mercaptan. Said acrylate resin had the following characteristics:
OH number: 134
average molecular weight: 2500
solids content: 75% by weight in butyl acetate
16.2 g of stabilized polymer dispersion as described in the EXAMPLES 5-9 (solids content 40% by weight in PGMA)
2 g of cellulose acetobutyrate
25 g of methoxylated methyl melamine The base coat compositions were brought to spraying consistency (efflux time of 25 sec. in Ford cup no. 3) with butyl acetate. The solids contents of the base coats were then at least about 40% by weight.

In addition, base coats of the above composition were prepared which instead of the aforementioned acrylate resin contained a polyester resin prepared from isophthalic acid, adipic acid, neopentyl glycol, trimentylol propane and hexahydrophthalic acid. This polyester had the following characteristics:
OH number: 98
acid number: 40
average molecular weight: 2000 solids content: 65% by weight in butyl acetate

After diluting to spraying consistency (25 sec. efflux time in Ford cup 3), the solids content of this series of base coats was again above 40% by weight.

For comparative purposes, a conventional base coat composition was prepared having the following composition:

| | |
|---|---|
| cellulose acetobutyrate | 27% by weight |
| hexamethoxymethyl melamine | 26.6% by weight |
| polyester resin | 26.3% by weight |
| aluminum paste 5000 AR (trademark of Silberline) | 14.6 by weight |
| wax (from wax dispersion) | 5.5% by weight |

The solids content of the conventional base coat composition was 11.8 by weight at spraying consistency (25 sec. efflux time Ford cup 3). The base coat coating compositions were sprayed onto steel test panels in a film thickness of about 15-20 um (in the dry state). The resulting test panels were predried for 5 minutes in a baking oven at a temperature of 60° C. Next, these test panels were partially covered up and the uncovered part was re-sprayed with a clear coat (in a film thickness of 40-45 um in the dry state). This clear coat was a so-called bicomponent acrylate/polyisocyanate coating composition, the polyisocyanate being the adduct of 3 moles of hexamethylene disocyanate to 1 mole of water. After curing in a baking oven for 20 minutes at 120° C. a metallic coat of high gloss was obtained, with an excellent resistance both to organic solvents and water. Of the metallic coats with the flop of both the base coat and the case coat covered with clear coat was measured (see Table I). The decrease of the flop by the application of the clear coat is a measure of the softening of the base coat by the clear coat, thus reducing the flop.

The flop values of the base coats based on the dispersions according to the invention (EXAMPLES 5-9) were all very high. The decrease of the flop upon application of the clear coat was small, so that a high flop of about 30 is maintained.

TABLE I

| Base coat of dispersion in PGMA according to dipsersion Example | solids content base-coat % by weight | flop of base coat x(−1000) | flop of base coat + clear coat x(−1000) | decrease of flop x(−1000) |
|---|---|---|---|---|
| 5 | 40.2 | 31.5 | 30.1 | 1.4 |
| 6 | 40.3 | 32.2 | 31 | 1.2 |
| 7 | 40.6 | 30.6 | 29.4 | 1.2 |
| 8 | 40.0 | 30 | 29.2 | 0.8 |
| 9 | 40.1 | 29.4 | 29.4 | 0 |
| conventional base coat | 11.8 | 34.0 | 31.1 | 2.9 |
| 5 | 40.4 | 31.0 | 28.2 | 2.8 |
| 6 | 40.5 | 30.0 | 27.5 | 2.5 |
| 7 | 40.7 | 30.0 | 27.4 | 2.6 |
| 8 | 40.2 | 29.7 | 29.2 | 0.5 |
| 9 | 40.0 | 28.7 | 28.3 | 0.4 |

The preferred embodiments of stabilizers, the stabilized dispersions produced therefrom, and the basecoat compositions comprising the stabilized dispersions which are disclosed above are illustrative of the concept of the present invention. Modification of the formulations by one skilled in the art can be used to extend the concept of the invention and provide optimization for particular applications. Such modification is intended to fall within the spirit and scope of the present invention as expressed in the appended claims.

What is claimed is:

1. A dispersion in an organic liquid of an addition polymer selected from the group consisting of an acrylate-based polymer, a methacrylate-based polymer and combinations thereof, wherein per 100 parts by weight of said addition polymer, said dispersion comprises 5-100 parts by weight of a stabilizer, said stabilizer comprising a graft copolymer composed of:
   (1) 10-60 parts by weight of a polybutadiene built up from at least 60% by weight 1,3-butadiene, having grafted to it the following;
   (2) 10-70 parts by weight of a first monomer mixture consisting essentially of
      (a) 20-60 mole % of a styrene,
      (b) 20-70 mole % of a hydroxyalkyl methacrylate having 2 to 6 carbon atoms in the alkyl group, and
      (c) 0-40 mole % of a monoethylenically unsaturated compound different from that of (b) and;
   (3) 0-60 parts by weight of a second monomer mixture consisting essentially of
      (d) 20-60 mole % of a styrene,
      (e) 30-80 mole % of a methacrylate selected from the group consisting of cycloalkyl methacrylates, alkyl methacrylates and combinations thereof, said cycloalkyl group or alkyl group having 1-12 carbon atoms and
      (f) 0-40 mole % of a monoethylenically unsaturated compound different from that of (e),
wherein the total parts by weight of said polybutadiene, said first monomer mixture and said second monomer mixture is 100 and wherein said styrene is selected from the group consisting of styrene and methylstyrenes.

2. The dispersion of claim 1 wherein said stabilizer comprises 10-60 parts by weight of said second monomer mixture.

3. The dispersion of claim 1 wherein said first monomer mixture consists essentially of:
   (a) 30-60 mole % of a styrene;
   (b) 30-70 mole % of a hydroxyalkyl methacrylate having 2 to 6 carbon atoms in said alkyl group; and
   (c) 0-20 mole % of a monoethylenically unsaturated compound different from that of (b).

4. The dispersion of claim 2 wherein said first monomer mixture consists essentially of:
   (a) 30-60 mole % of a styrene;
   (b) 30-70 mole % of a hydroxyalkyl methacrylate having 2 to 6 carbon atoms in said alkyl group; and
   (c) 0-20 mole % of a monoethylenically unsaturated compound different from that of (b).

5. The dispersion of claim 1, wherein said polybutadiene is built up from at least 80% by weight of 1,3-butadiene.

6. The dispersion of claim 2, wherein said polybutadiene is built up from at least 80% by weight of 1,3-butadiene.

7. The dispersion of claim 3, wherein said polybutadiene is built up from at least 80% by weight of 1,3-butadiene.

8. The dispersion of claim 4, wherein said polybutadiene comprises at least 80% by weight of 1,3-butadiene.

9. The dispersion of claim 1 wherein said polybutadiene has a number average molecular weight ranging from about 2,000 to about 6,000.

10. A coating composition comprising the dispersion of claim 1, and a polymer or resin selected from the group consisting of polyacrylates, polyesters, polyurethanes, alkyd resins and combinations thereof, wherein said dispersion is present in amounts ranging from about 5% to about 40% by weight of the combination.

11. A process for the preparation of a dispersion stabilizer effective in stabilizing dispersions of (meth)acrylate polymers in organic liquids comprising a graft polymer composed of:
(1) 10-60 parts by weight of a polybutadiene built up from at least 60% by weight 1,3-butadiene, having grafted to it the following;
(2) 10-70 parts by weight of a first monomer mixture consisting essentially of
    (a) 20-60 mole % of a styrene,
    (b) 20-70 mole % of a hydroxyalkyl methacrylate having 2 to 6 carbon atoms in the alkyl group, and
    (c) 0-40 mole % of a monoethylenically unsaturated compound different from that of (b) and;
(3) 0-60 parts by weight of a second monomer mixture consisting essentially of
    (d) 20-60 mole % of a styrene,
    (e) 30-80 mole % of methacrylate selected from the group consisting of cycloalkyl methacrylates, alkyl methacrylates and combinations thereof, said cycloalkyl group or alkyl group having 1-12 carbon atoms and
    (f) 0-40 mole % of a monoethylenically unsaturated compound different from that of (e),
wherein the total parts by weight of said polybutadiene, said first monomer mixture and said second monomer mixture is 100 and wherein said styrene is selected from the group consisting of styrene and methylstyrenes; wherein said first monomer mixture is copolymerized in the presence of said polybutadiene in an organic solvent at a temperature ranging from about 60° C. to about 150° C., wherein a radical initiator is used in an amount ranging from about 1% to about 12% by weight of said polybutadiene.

12. A process according to claim 11, wherein said first and second monomer mixtures are copolymerized, in random order, in the presence of said polybutadiene.

13. A process according to claim 11, wherein said first monomer mixture is copolymerized in the presence of said polybutadiene, after which said second monomer mixture is copolymerized in the presence of the resulting reaction product.

14. A coating composition comprising the dispersion of claim 1.

15. A coating composition comprising the dispersion of claim 2.

16. A coating composition comprising the dispersion of claim 3.

17. A coating composition comprising the dispersion of claim 4.

18. A basecoat capable of providing a high-gloss metallic appearance, wherein said basecoat comprises:
(a) a polyacrylate resin;
(b) the dispersion of Claim 1;
(c) a metallic paste; and
(d) a curing agent.

19. The basecoat of claim 18 wherein said curing agent is selected from the group consisting of melamine resins, polyisocyanates, and blocked polyisocyanates.

20. A process for coating a substrate with a coating which comprises the dispersion of claim 1, wherein said coating is applied to said substrate using a manner of application selected from the group consisting of roller coating, spray coating, brushing, sprinkling, flowcoating, dipping, electrostatic spraying, electrophoreses, and combinations thereof.

21. The coating composition of claim 10 which further comprises a curing agent.

22. A dispersion stabilizer effective in stabilizing dispersions of (meth)acrylate-based polymers in organic liquids, comprising a graft polymer composed of:
(1) 10-60 parts by weight of a polybutadiene built up from at least 60% by weight 1,3-butadiene, having grafted to it the following;
(2) 10-70 parts by weight of a first monomer mixture consisting essentially of
    (a) 20-60 mole % of a styrene,
    (b) 20-70 mole % of a hydroxyalkyl methacrylate having 2 to 6 carbon atoms in the alkyl group, and
    (c) 0-40 mole % of a monoethylenically unsaturated compound different from that of (b); and
(3) 0-60 parts by weight of a second monomer mixture consisting essentially of
    (d) 20-60 mole % of a styrene,
    (e) 30-80 mole % of a methacrylate selected from the group consisting of cycloalkyl methacrylate, alkyl methacrylates and combinations thereof, said cycloalkyl group or alkyl group having 1-12 carbon atoms and
    (f) 0-40 mole % of a monoethylenically unsaturated compound different from that of (e),
wherein the total parts by weight of said polybutadiene, said first monomer mixture and said second monomer mixture is 100 and wherein said styrene is selected from the group consisting of styrene and methylstyrenes.

23. A dispersion stabilizer according to claim 22 wherein said first monomer mixture is copolymerized in the presence of said polybutadiene in an organic solvent at a temperature ranging from about 60° C. to about 150° C., and a radical initiator is used in an amount ranging from abvout 1 to about 12 percent by weight of said polybutadiene.

24. A dispersion stabilizer according to claim 23 wherein said first and second monomer mixtures are copolymerized, in random order, in the presence of said polybutadiene.

25. A dispersion stabilizer according to claim 22 wherein said first monomer mixture is copolymerized in the presence of said polybutadiene, after which said second monomer mixture is copolymerized in the presence of the resulting reaction product.

26. A dispersion stabilizer according to claim 25 wherein said first and second monomer mixtures are each copolymerized in the presence of said polybutadiene and said reaction product, respectively, at temperatures ranging from about 60° C. to about 150° C. and a radical initiator is used in an amount ranging from about 1 to about 12 percent by weight of said polybutadiene.

* * * * *